(12) United States Patent
Nakamura et al.

(10) Patent No.: US 7,796,884 B2
(45) Date of Patent: Sep. 14, 2010

(54) WAVELENGTH PATH SWITCHING NODE APPARATUS AND WAVELENGTH PATH ALLOCATION METHOD

(75) Inventors: Hajime Nakamura, Shiki (JP); Hiroyuki Yokoyama, Tokyo (JP); Shinichi Nomoto, Tokyo (JP)

(73) Assignee: Kiddi Corporation, Tokyo (JP)

( * ) Notice: Subject to any disclaimer, the term of this patent is extended or adjusted under 35 U.S.C. 154(b) by 1967 days.

(21) Appl. No.: 10/789,537

(22) Filed: Feb. 26, 2004

(65) Prior Publication Data

US 2004/0172444 A1 Sep. 2, 2004

(30) Foreign Application Priority Data

Feb. 28, 2003 (JP) ............................. 2003-053249

(51) Int. Cl.
*H04J 14/00* (2006.01)
(52) U.S. Cl. ............................. 398/50; 398/49; 398/48; 398/45; 398/57
(58) Field of Classification Search ............... 398/51, 398/50, 54, 45, 57, 49, 48
See application file for complete search history.

(56) References Cited

U.S. PATENT DOCUMENTS

| 6,665,495 | B1 * | 12/2003 | Miles et al. | 398/54 |
| 6,819,870 | B1 * | 11/2004 | Ge et al. | 398/51 |
| 6,879,783 | B1 * | 4/2005 | Nakahira | 398/51 |
| 7,272,313 | B2 * | 9/2007 | Nakamura et al. | 398/51 |

| 2001/0024305 | A1 | 9/2001 | Nishimoto | |
| 2001/0036202 | A1 * | 11/2001 | Watanabe et al. | 370/535 |

(Continued)

FOREIGN PATENT DOCUMENTS

JP 11-261596 9/1999

(Continued)

OTHER PUBLICATIONS

Performance of a Dynamically Wavelength-Routed, Optical Burst Switched Network Michel Duser and Polina Bavel Optical College London, Torrington Place, London WCIE 7JE,UK,{p.bayvel.mdueser}@ee.ucl.ac.uk ©2001 IEEE.*
Japanese Office Action dated Nov. 7, 2006 (with English translation).

*Primary Examiner*—Ken N Vanderpuye
*Assistant Examiner*—Hibret A Woldekidan
(74) *Attorney, Agent, or Firm*—Edwards Angell Palmer & Dodge LLP (57) ABSTRACT

A wavelength path switching node apparatus is provided that improves the utilization efficiency of wavelength resources by allocating wavelength paths by following traffic variations in packet units. A node apparatus on the wavelength path start point side includes: a packet distributing section that stores input packets in a buffer, fetches the packets from the buffer and distributes to an initial path and additional paths; a control section that allocates the additional paths based on distribution states of the packet units; and an optical switch that switches wavelength paths based on this control. A node apparatus on the wavelength path end point side includes: a monitoring section that monitors packets distributed to the initial path and the additional paths; a control section that allocates the additional paths based on distribution states of the packet units obtained by this monitoring; and an optical switch that switches wavelength paths based on this control.

8 Claims, 7 Drawing Sheets

U.S. PATENT DOCUMENTS

| | | | |
|---|---|---|---|
| 2002/0024700 A1* | 2/2002 | Yokoyama et al. | 359/135 |
| 2002/0054732 A1* | 5/2002 | Zheng | 385/24 |
| 2002/0191626 A1 | 12/2002 | Moriwaki et al. | |
| 2004/0037557 A1* | 2/2004 | Yokoyama et al. | 398/45 |

FOREIGN PATENT DOCUMENTS

| | | |
|---|---|---|
| JP | 2001-268606 | 9/2001 |
| JP | 2001-333045 | 11/2001 |
| JP | 2003-8619 | 1/2003 |

\* cited by examiner

FIG. 6  Two traffic streams are integrated by Relay Node 50

FIG. 7 Two traffic streams are divided by Relay Node 50

WAVELENGTH PATH SWITCHING NODE APPARATUS AND WAVELENGTH PATH ALLOCATION METHOD

BACKGROUND OF THE INVENTION

1. Field of the Invention

The present invention relates to a wavelength path switching node apparatus and wavelength path allocation method in an optical communication network (i.e., a wavelength division multiplexing (WDM) network) that employs a wavelength division multiplexing transmission scheme.

Priority is claimed on Japanese patent application No. 2003-53249, filed Feb. 28, 2003, the content of which is incorporated herein by reference.

2. Description of Related Art

Conventional wavelength path switching node apparatuses monitor traffic intended to be output from a plurality of apparatuses (for example, from IP routers) that accommodate local nodes to a WDM network, and perform autonomous control so as to allocate a wavelength path based on the results of this monitoring (for example, see Japanese Unexamined Patent Application, First Publication No. 2001-333045). In the WDM network, a pair of wavelength path switching node apparatuses dynamically adds and cuts wavelength paths of facing intervals thereof without performing signaling. As a result, the structure required to perform the signaling can be simplified and an improvement in wavelength usage efficiency can be achieved by a statistical multiplexing effect. In addition, wavelength paths set over a plurality of intervals are dealt with by connecting a pair of wavelength path switching node apparatuses in tandem.

However, in the above described conventional technology, because wavelength paths are increased or decreased using traffic formed by a plurality of packets as monitoring units, it is not possible to control the allocation of wavelength paths by following traffic variations in the packet units.

SUMMARY OF THE INVENTION

The present invention was conceived in view of the above circumstances and it is an object thereof to provide a wavelength path switching node apparatus and a wavelength path allocation method that allow an improvement in the utilization efficiency of wavelength resources to be achieved by controlling the allocation of wavelength paths by following traffic variations in the packet units.

In order to achieve the above objects, the wavelength path switching node apparatus according to a first aspect of the present invention is a wavelength path switching node apparatus that is used in an optical communication network that performs multiplex transmissions by allocating a plurality of traffic items to a plurality of wavelength paths using a wavelength division multiplexing transmission scheme, comprising: a buffer that stores packets of input traffic; a packet transmission control section that fetches packets from the buffer, and, with top priority given to a semifixed initial path, distributes the packets to the initial path and to dynamically allocated additional paths; a control section that controls allocations of the additional paths based on distribution states of packet units in the packet transmission control section; and a wavelength path switching section that switches wavelength paths in accordance with the allocation control of the additional paths.

The wavelength path switching node apparatus according to a second aspect of the present invention is a wavelength path switching node apparatus that is used in an optical communication network that performs multiplex transmissions by allocating a plurality of traffic items to a plurality of wavelength paths using a wavelength division multiplexing transmission scheme, comprising: a monitoring section that monitors packets of input traffic that are distributed, with top priority given to a semifixed initial path, to the initial path and to dynamically allocated additional paths; a control section that controls allocations of the additional paths based on distribution states of packet units obtained by the monitoring; and a wavelength path switching section that switches wavelength paths in accordance with the allocation control of the additional paths.

The wavelength path switching node apparatus according to a third aspect of the present invention is a wavelength path switching node apparatus that is used in an optical communication network that performs multiplex transmissions by allocating a plurality of traffic items to a plurality of wavelength paths using a wavelength division multiplexing transmission scheme, comprising: a monitoring section that monitors packets of input traffic that are distributed, with top priority given to a semifixed initial path, to the initial path and to dynamically allocated additional paths; a first control section that controls allocations of the additional paths based on distribution states of packet units obtained by the monitoring; a first wavelength path switching section that switches wavelength paths in accordance with the allocation control of the additional paths by the first control section; a buffer that stores packets of the input traffic; a packet transmission control section that fetches packets from the buffer, and, with top priority given to the initial path, distributes the packets to the initial path and to the additional paths; a second control section that controls allocations of the additional paths based on distribution states of packet units in the packet transmission control section; and a second wavelength path switching device that switches wavelength paths in accordance with the allocation control of the additional paths by the second control section.

In the above described wavelength path switching node apparatuses, it is also possible for the packet transmission control section to distribute packets to the additional paths in accordance with a predetermined order of priority.

In the above described wavelength path switching node apparatuses, it is also possible for the control unit to allocate at least one reserve additional path when packets are being distributed.

The wavelength path allocation method according to a first aspect of the present invention is a wavelength path allocation method for a wavelength path switching node apparatus that is used in an optical communication network that performs multiplex transmissions by allocating a plurality of traffic items to a plurality of wavelength paths using a wavelength division multiplexing transmission scheme, comprising: a step in which packets of input traffic are stored in a buffer; a packet distributing step in which packets are fetched from the buffer, and, with top priority given to a semifixed initial path, the packets are distributed to the initial path and to dynamically allocated additional paths; and a step in which allocations of the additional paths are controlled based on distribution states of packet units in the packet distributing step.

The wavelength path allocation method according to a second aspect of the present invention is a wavelength path allocation method for a wavelength path switching node apparatus that is used in an optical communication network that performs multiplex transmissions by allocating a plurality of traffic items to a plurality of wavelength paths using a wavelength division multiplexing transmission scheme, comprising: a step in which packets of input traffic that are distributed, with top priority given to a semifixed initial path, to the initial path and to dynamically allocated additional paths are monitored; and a step in which allocations of the additional paths are controlled based on distribution states of packet units obtained by the monitoring.

The wavelength path allocation method according to a third aspect of the present invention is a wavelength path allocation method for a wavelength path switching node apparatus that is used in an optical communication network that performs multiplex transmissions by allocating a plurality of traffic items to a plurality of wavelength paths using a wavelength division multiplexing transmission scheme, comprising: a step in which packets of input traffic that are distributed, with top priority given to a semifixed initial path, to the initial path and to dynamically allocated additional paths are monitored; a first control step in which allocations of the additional paths in a first wavelength path switching section are controlled based on distribution states of packet units obtained by the monitoring; a step in which packets of input traffic are stored in a buffer; a packet distributing step in which packets are fetched from the buffer, and, with top priority given to the initial path, the packets are distributed to the initial path and to the additional paths; and a second control step in which allocations of the additional paths in a second wavelength path switching section are controlled based on distribution states of packet units in the packet distributing step.

In the above wavelength path allocation methods, in the packet distributing step, it is also possible for the packets to be distributed to the additional paths in accordance with a predetermined order of priority.

In the above wavelength path allocation methods, in the control step, it is also possible for at least one reserve additional path to be allocated when packets are being distributed.

According to the present invention, because allocations of additional paths are controlled based on distribution states of packet units distributed to the initial path and to the additional paths, the allocation of wavelength paths can be controlled to follow to traffic variations in packet unit. As a result, an improvement in the utilization efficiency of wavelength resources can be achieved.

BRIEF DESCRIPTION THE DRAWINGS

FIGS. 6-7 are block diagrams showing how the relay node 50 shown in FIG. 4 and the OXC(s) 3a and 3b shown in FIG. 1 are connected, where FIG. 6 shows two traffic streams being integrated and FIG. 7 shows two traffic streams being divided.

DETAILED DESCRIPTION OF THE INVENTION

Embodiments of the present invention will now be described with reference made to the drawings.

Figure 1:
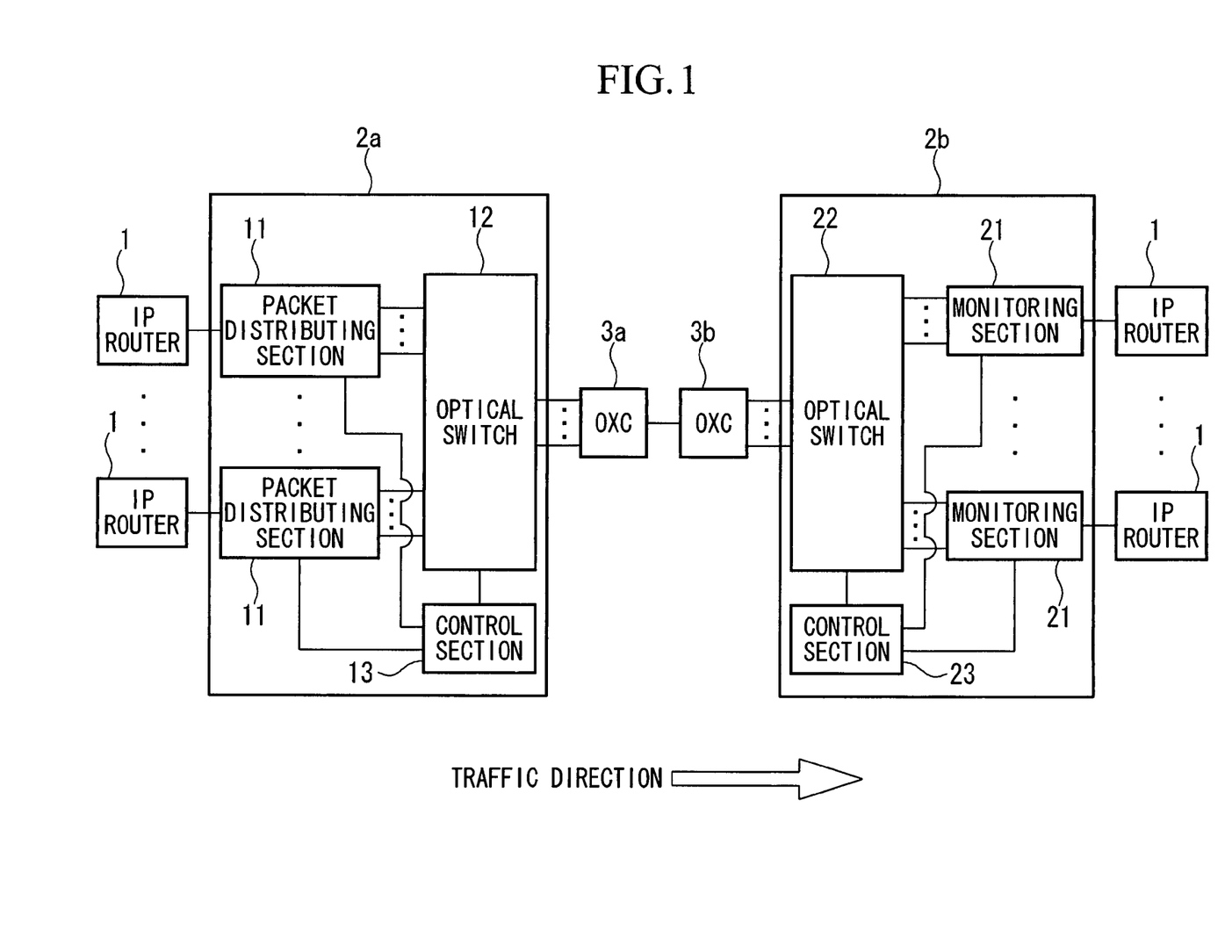
FIG. 1 is a block diagram showing an outline of a structural example of a WDM network provided with wavelength path switching node apparatuses 2a and 2b according to an embodiment of the present invention.

FIG. 1 is a block diagram showing an outline of a structural example of a WDM network provided with wavelength path switching node apparatuses 2a and 2b according to an embodiment of the present invention. This WDM network has a point-to-point connection structure. In the WDM network shown in FIG. 1, traffic flows in a direction moving from the wavelength path switching node apparatus (referred to below simply as "node apparatus") 2a on the wavelength path start point side towards the node apparatus 2b on the wavelength path end point side.

The structure and operation of the entire WDM network shown in FIG. 1 will now be described.

In FIG. 1, the node apparatus 2a is connected with a plurality of IP routers (referred to below simply as "routers") by respective optical fiber cables. The node apparatus 2a is connected to an optical cross connector (OXC) 3a that establishes a semifixed wavelength path by optical fiber cables. The OXC 3a is connected with an opposing OXC 3b by optical fiber cable. The node apparatus 2b is connected to the OXC 3b by optical fiber cable, and is also connected to a plurality of routers 1 by respective optical fiber cables.

The node apparatus 2a allocates input traffic input from each router 1 to a plurality of wavelength paths, and outputs this traffic to the OXC 3a. The OXC 3a multiplexes the input traffic of each wavelength path and sends it to the OXC 3b. The OXC 3b demultiplexes the traffic of each wavelength path received from the OXC 3a and outputs it to the node apparatus 2b. The node apparatus 2b outputs the input traffic of the plurality of wavelength paths to a corresponding router 1.

Next, the structure and operation of the node apparatus 2a will be described.

In FIG. 1, the node apparatus 2a is provided with packet distributing sections 11, an optical switch 12 (i.e., a wavelength path switching device) and a control unit 13. A packet distributing section 11 is provided for each router 1. The packet distributing sections 11 distributes packets of traffic input from the corresponding router 1 to an initial path, which is a semifixed wavelength path, and additional paths, which are wavelength paths for dynamic allocation. The packets distributed to the initial path are output to an input port for the initial path of the optical switch 12. The packets distributed to the additional paths are output to input ports for additional paths of the optical switch 12.

The optical switch 12 switches wavelength paths in accordance with wavelength path switching settings from the control unit 13. Input packets of the input port for the initial path are output to an output port for the initial path that is initially set. The connection relationship between the input port for the initial path and the output port for the initial path is semifixedly set. Input packets of input ports for additional paths are output to output ports for additional paths that are set as is appropriate to the circumstances. The connection relationships between the input ports for additional paths and the output ports for additional paths are dynamically set. In each output port conversion into a predetermined wavelength is performed. Outputs from each output port are connected to the OXC 3a.

The control unit 13 receives packet distribution signals that show distribution states of packet units to the initial path and additional paths from each packet distributing section 11. The control unit 13 ascertains the distribution state of packet units distributed to the initial path and additional paths from these packet distribution signals. The allocation of additional paths is controlled based on the ascertained distribution states of the packet units. As a result, the establishment and release of additional paths between the node 2a and the downstream node 2b is performed autonomously.

Figure 2:
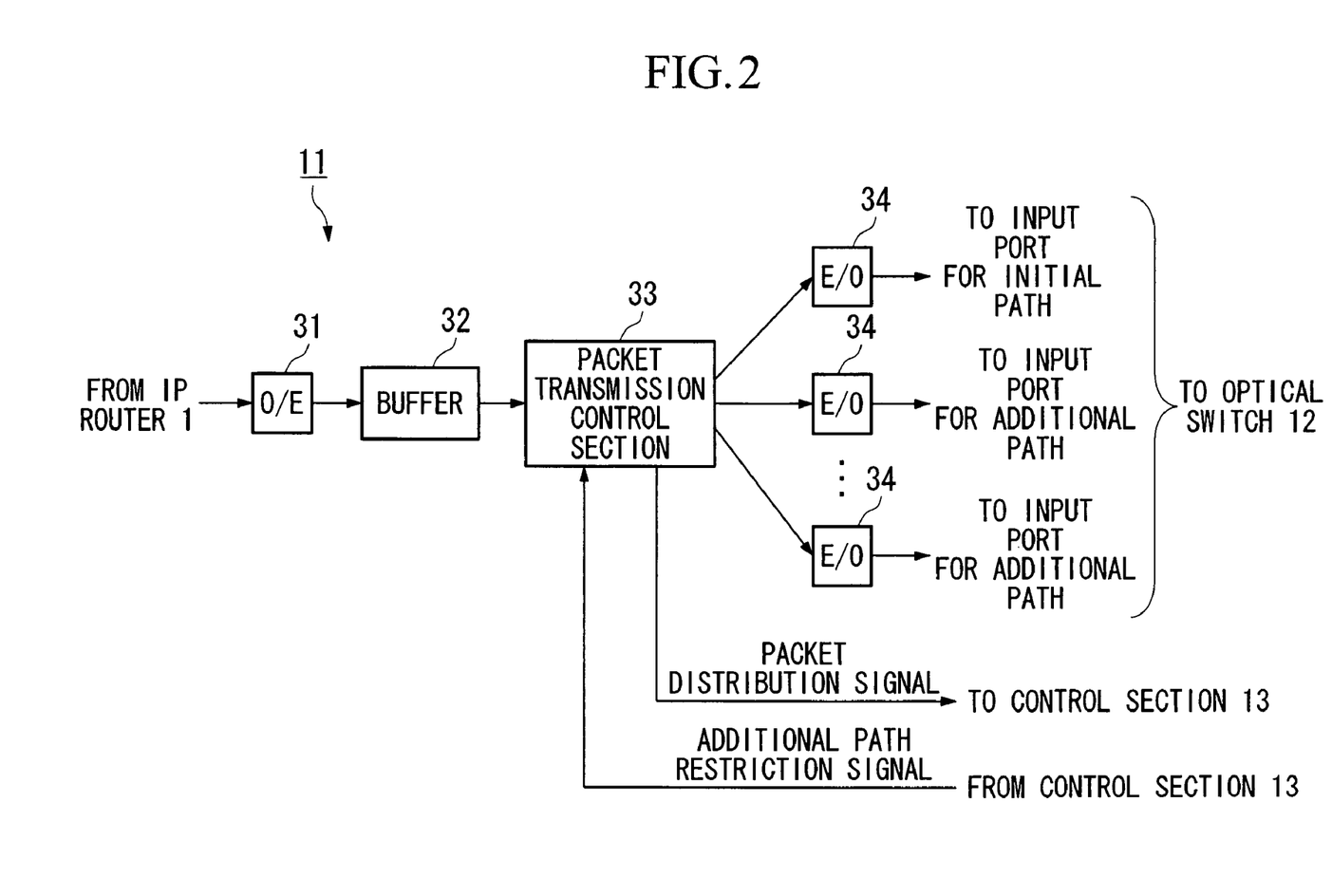
FIG. 2 is a block diagram showing the structure of a packet distributing section 11.

FIG. 2 is a block diagram showing the structure of the packet distributing section 11. In FIG. 2, the packet distributing section 11 is provided with an optical/electrical converter (O/E) 31, a buffer 32, a packet transmission control unit 33, and electrical/optical converters (E/O) 34. An E/O 34 is provided to correspond to each initial path and additional path. The optical output of the E/O 34 for the initial path is connected to the initial path input port of the optical switch 12. Optical outputs of the E/O 34 for each additional path are connected respectively to the corresponding additional path input port of the optical switch 12.

The O/E 31 converts packets of input traffic input from a router 1 which are optical signals into electrical signals, and outputs them to the buffer 32. The buffer 32 stores input packets.

The packet transmission control unit 33 acquires packets from the buffer 32 and outputs them to the initial path E/O 34 or to the additional path E/O 34. Here, the packet transmission control unit 33 outputs packet distribution signals to the control unit 13. Each E/O 34 converts input packets which are electrical signals into optical signals, and outputs these to each input port connected to the optical switch 12.

Next, a packet distributing operation of the packet transmission control unit 33 and an additional path allocation operation of the control unit 13 will be described. When distributing packets to the initial path and additional paths, the packet transmission control unit 33 gives top priority to distributing packets to the initial path. The packet transmission control section 33 also distributes packets to additional paths in a predetermined order of priority. This order of priority of the additional paths is also preset in the control unit 13.

When a packet is distributed, the control unit 13 allocates at least one reserve additional path to input traffic from the relevant router 1.

Firstly, the packet transmission control unit 33 acquires the first packet from the buffer 32, and outputs it to the initial path E/O 34. Here, the packet transmission control unit 33 notifies the control unit 13 that a packet is being distributed to the initial path using a packet distribution signal. As a result of this notification, the control unit 13 allocates the first additional path in the order of priority as a reserve path.

Next, while the packet is being output to the initial path E/O 34, if a packet is still remaining inside the buffer 32, the packet transmission control unit 33 fetches the packet from the buffer 32 and outputs it to the additional path E/O 34 that is first in the order of priority. Here, the packet transmission control unit 33 notifies the control unit 13 that packets are being distributed to the initial path and to one additional path using a packet distribution signal. As a result of this notification, the control unit 13 allocates the second additional path in the order of priority as a reserve additional path.

Next, while packets are being output to the initial path E/O 34 and the additional path E/O 34 that is first in the order of priority, if a packet still remains in the buffer 32, the packet transmission control unit 33 fetches the packet from the buffer 32 and outputs it to the additional path E/O 34 that is second in the order of priority. Here, the packet transmission control unit 33 notifies the control unit 13 that packets are being distributed to the initial path and to two additional paths using a packet distribution signal. As a result of this notification, the control unit 13 allocates the third additional path in the order of priority as a reserve additional path. Thereafter, in the same manner, when packets are being distributed to the initial path and to all additional paths that have already been allocated apart from the reserve additional path, and also when a new packet is being transmitted, the reserve additional path is used. In addition, the next additional path in the order of priority is allocated as the reserve additional path.

When the output of a packet to the initial path E/O 34 has ended, if a packet remains in the buffer 32, that packet is output to the initial path E/O 34 and the initial path is used. While the initial path is in use, if a packet remains in the buffer 32 then sequential additional paths are used in accordance with the order of priority.

Using the above-described packet distributing method, the initial path is always used when a packet is transmitted. Furthermore, additional paths are used in sequence starting from the additional path having the highest order of priority, without any additional path being skipped. As a result, the utilization efficiency of the wavelength paths is improved considerably.

Note that when it is not possible to allocate a new additional path the control unit 13 outputs an additional path restriction signal to the packet distributing section 11. When it receives an additional path restriction signal the packet transmission control unit 33 performs subsequent packet transmissions using only paths that are already in use.

Moreover, when the additional path having the lowest order of priority from among the additional paths that have been allocated is not being used, then if the additional path that is one rank higher in the order of priority is also not being used, the control unit 13 releases the additional path having the lowest order of priority. The determination that a packet is not being used is made by determining that the packet has not been continuously distributed to the relevant path over a period equal to or greater than the minimum time interval over which packets are continuously transmitted.

Next, the structure and operation of the node apparatus 2b will be described.

In FIG. 1, the node apparatus 2b is provided with monitoring sections 21, an optical switch 22 (i.e., a wavelength path switching device) and a control unit 23. A monitoring section 21 is provided for each router 1.

The optical switch 22 switches wavelength paths in accordance with wavelength path switching settings from the control unit 23. Traffic of each wavelength path from the OXC 3b is demultiplexed and input into the optical switch 22. Initial path packets are input into a predetermined initial path input port. Additional path packets are input into predetermined additional path input ports. Input packets of the initial path input port are output to an initial path output port that is initially set as being for the use of a destination router 1. The connection relationship between this initial path input port and the initial path output port is semifixedly set. Input packets of additional path input ports are output to additional path output ports that are appropriately set as being for the use of destination router 1. The connection relationships between the additional path input ports and the additional path output ports are dynamically set. In each output port conversion into a predetermined wavelength is performed. Outputs from each output port are connected to the corresponding monitoring section 21.

Packets of traffic that are intended to be transmitted to the corresponding router 1 are distributed to the initial path and the additional paths, and they are input into the monitoring sections 21. The monitoring sections 21 monitor the packets of each wavelength path. These packets of each wavelength are output to the corresponding router 1 via the monitoring sections 21.

The control unit 23 receives packet distribution signals from the respective monitoring sections 21 that show distribution states of packet units to the initial path and additional paths. The control unit 23 ascertains the distribution state of packet units distributed to the initial path and additional paths from these packet distribution signals. The allocation of additional paths is controlled based on the ascertained distribution states of the packet units.

Figure 3:
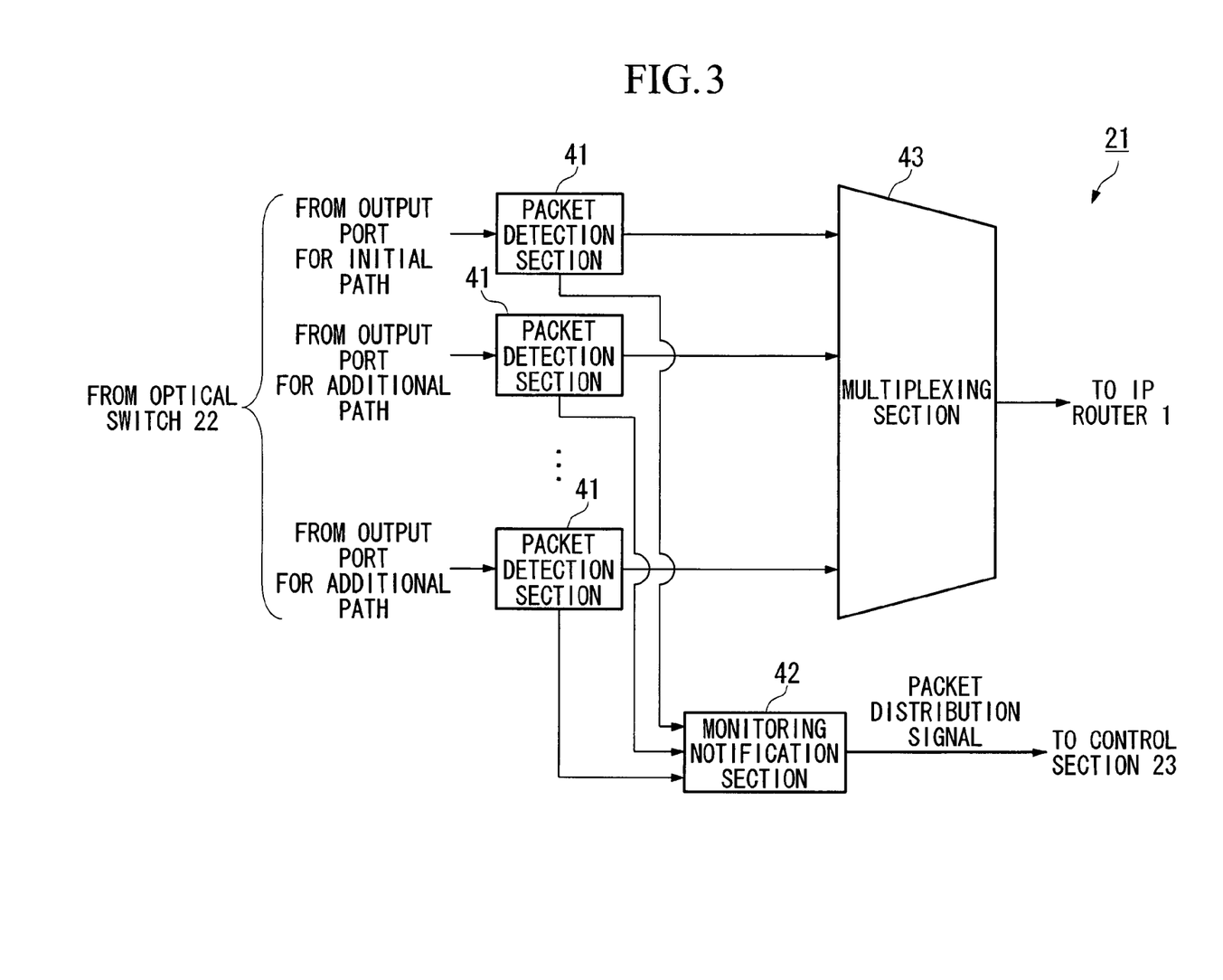
FIG. 3 is a block diagram showing the structure of a monitoring section 21.

FIG. 3 is a block diagram showing the structure of a monitoring section 21. In FIG. 3, the monitoring section 21 is provided with packet detection sections 41, a monitoring notification section 42, and a multiplexing section 43. A packet detection section 41 is provided to correspond to the initial path and to each additional path. An optical input of the initial path packet detection section 41 is connected to an initial path output port of the optical switch 22. An optical input of each additional path packet detection section 41 is connected to the corresponding additional path output port of the optical switch 22.

The packet detection sections 41 observe input optical signals and determine whether or not a packet has been input. When it is detected that a packet has been input, the relevant packet detection section 41 notifies the monitoring notification section 42. As a result of the packet input notification from the relevant packet detection section 41, the monitoring notification section 42 then creates a packet distribution signal and outputs it to the control unit 23.

Packets of each wavelength path are input into the multiplexing section 43 via the respective monitoring section 41. The multiplexing section 43 multiplexes optical signals of the input packets and outputs them to the corresponding router 1.

The control unit 23, in the same way as the above described control unit 13, allocates additional paths based on packet distribution signals from the respective monitoring sections 21. As a result, the establishment and release of additional paths between the node 2b and the upstream node 2a is performed autonomously.

Note that in the above described embodiment it is also possible to employ a structure in which the packet distributing sections 11 are placed on the corresponding router 1 side. In the same way, the monitoring sections 21 may also be placed on the corresponding router 1 side.

Figure 4:
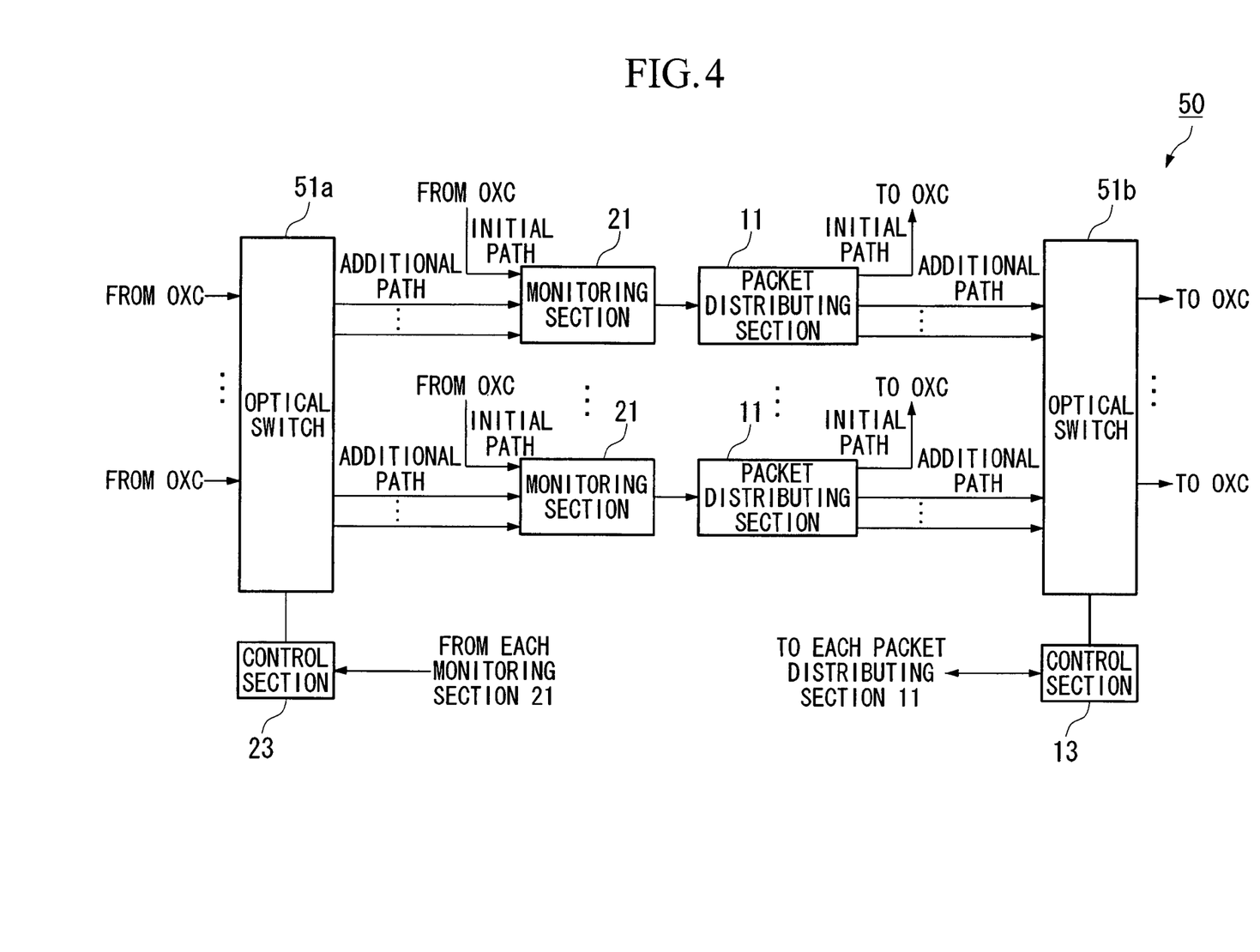
FIG. 4 is a block diagram showing the structure of a relay node apparatus 50 according to an embodiment of the present invention.

Next, a description will be given of a relay node apparatus serving as a wavelength path switching node apparatus according to another embodiment of the present invention. FIG. 4 is a block diagram showing the structure of a relay node apparatus 50 according to an embodiment of the present invention. In FIG. 4, portions that correspond to portions in FIG. 1 are given the same reference symbol and a description thereof is omitted.

The relay node apparatus 50 shown in FIG. 4 forms a WDM network by connecting relays nodes in tandem, and establishes wavelength paths over a plurality of intervals. In FIG. 4, the relay node apparatus 50 is provided with an optical switch 51a (i.e., a first wavelength path switching device), an optical switch 51b (i.e., a second wavelength path switching device), a control unit 23 for the optical switch 51a (i.e., a first control unit), a control unit 13 for the optical switch 51b (i.e., a second control unit), monitoring sections 21, and packet distributing sections 11. The monitoring sections 21 and the packet distributing sections 11 are provided in pairs.

Packets distributed from the OXC to each additional path are input into the optical switch 51a on the input side. The optical switch 51a performs wavelength path switching in accordance with wavelength path switching settings from the control unit 23, and outputs the input packets of each additional path to the monitoring section 21 that corresponds to the respective additional path.

Additional path packets are input from the optical switch 51a into the monitoring sections 21, while initial path packets are input from the OXC into the monitoring sections 21. The monitoring sections 21 respectively monitor the initial path and additional path input packets and create packet distribution signals that are output to the control unit 23. The control unit 23 allocates additional paths based on the packet distribution signals from the respective monitoring sections 21. As a result, the establishment and release of additional paths with the upstream node apparatus is performed autonomously.

Packets input into the monitoring sections 21 are output to the corresponding packet distributing section 11. Additional path packets from the monitoring section 21 are input into the packet distributing sections 11, while initial path packets from the OXC are also input into the packet distributing sections 11. The packet distributing sections 11 distribute input packets to an initial path and to additional paths, and also output packet distribution signals to the control unit 13. The packet distributing sections 11 also forbid the allocation of new additional paths in response to an additional path restriction signal from the control unit 13.

The control unit 13 allocates additional paths based on the packet distributing signals from the respective packet distributing sections 11. As a result, the establishment and release of additional paths with the downstream node apparatus is performed autonomously.

Packets distributed to the initial path by the packet distributing section 11 are output from the packet distributing section 11 to the OXC. On the other hand, packets distributed to additional paths are output from the packet distributing sections 11 to the optical switch 51b. The optical switch 51b switches wavelength paths in accordance with wavelength path switching settings from the control unit 13, and outputs packets input into each additional path to the OXC that corresponds to each additional path.

As described above, according to an embodiment of the present invention, because allocations of additional paths are controlled based on distribution states of packet units distributed to the initial path and to the additional paths, the allocation of wavelength paths can be controlled to follow to traffic variations in packet units. As a result, an improvement in the utilization efficiency of wavelength resources can be achieved.

In addition, because additional paths are distributed in accordance with a predetermined order of priority, the utilization efficiency of the additional paths is improved.

Moreover, because at least one reserve additional path is allocated when a packet is distributed, the stability of the packet distribution is improved.

Figure 6:
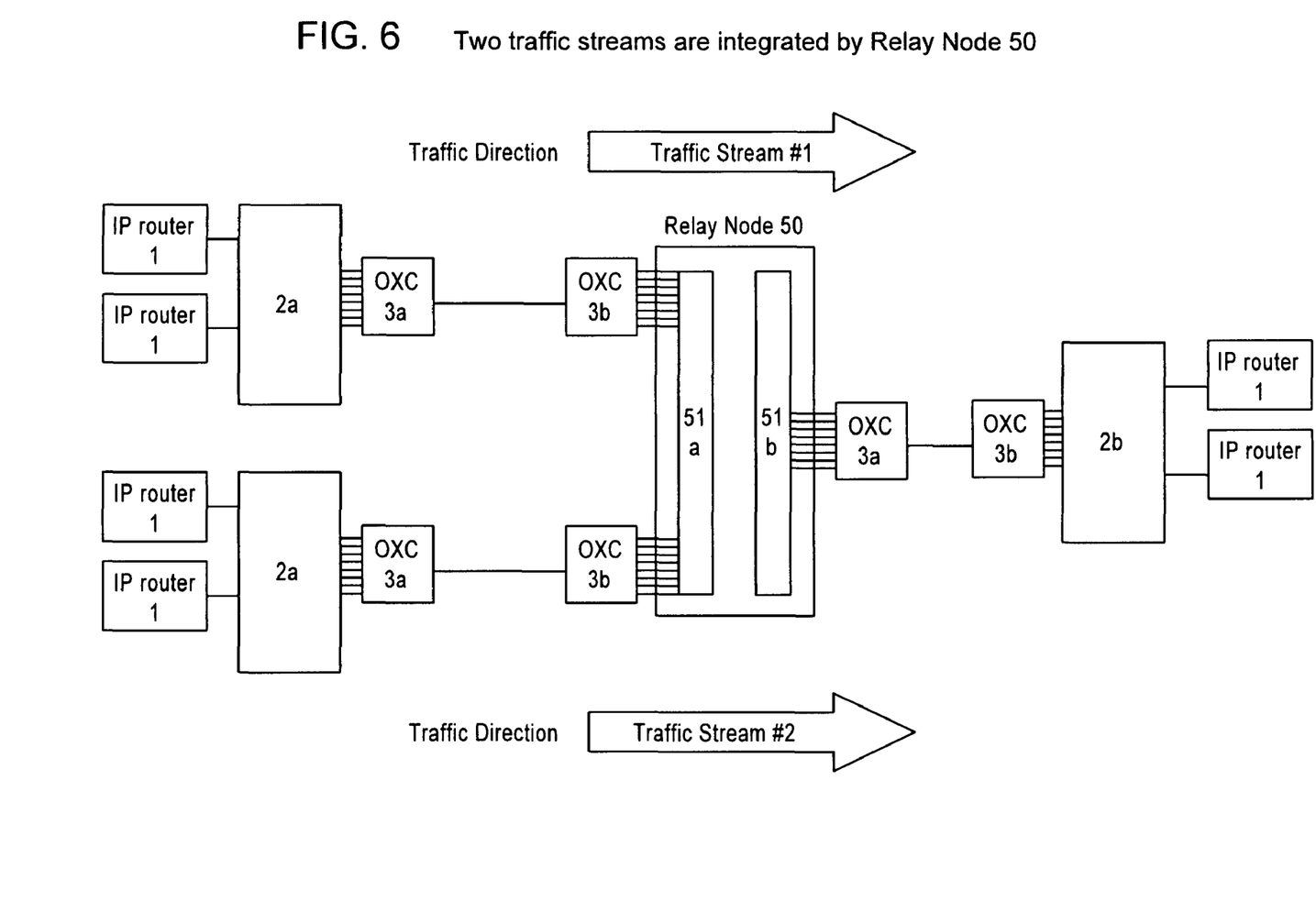
Figure 7:
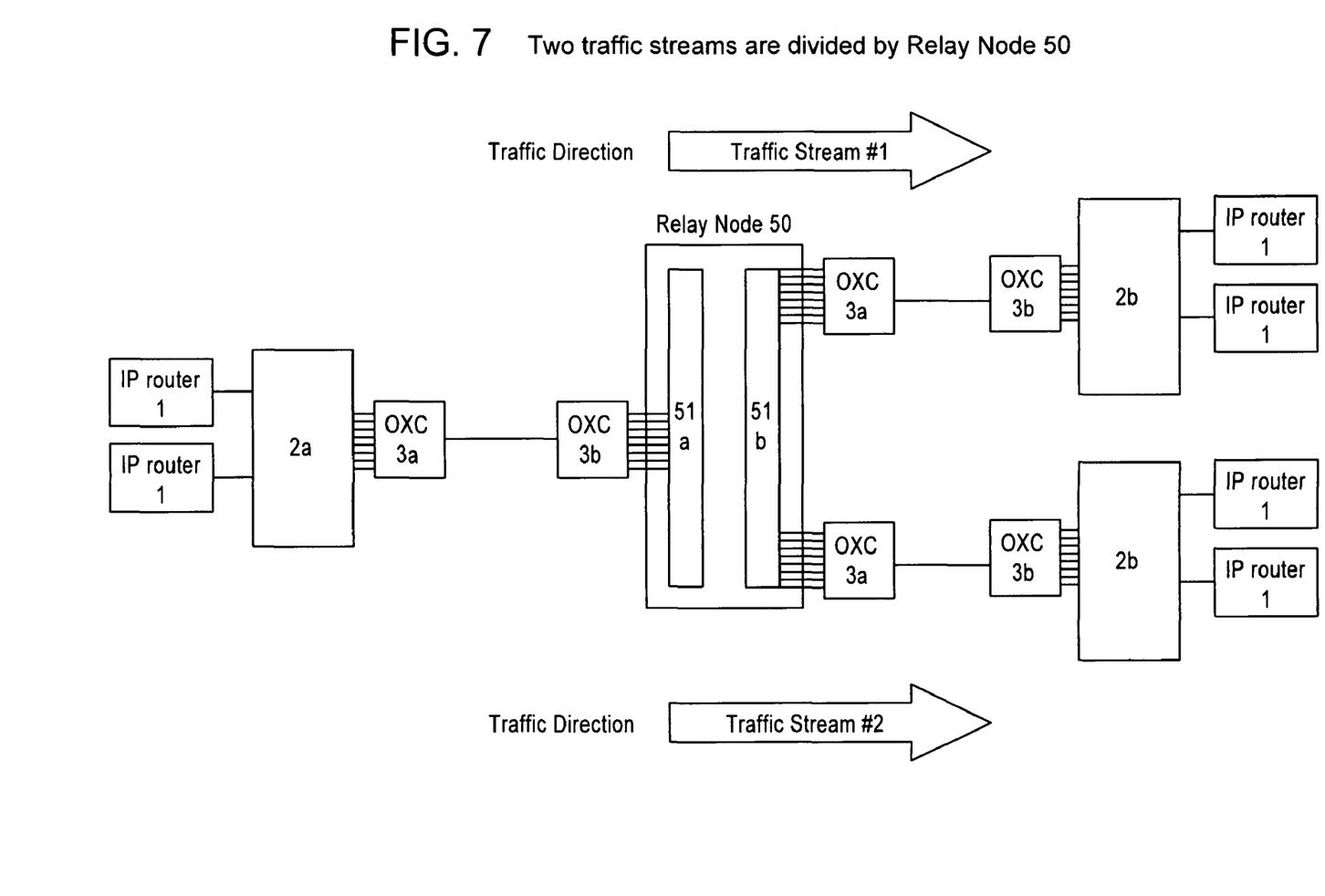

In FIGS. 6-7, the relay node 50 shown in FIG. 4 and OXC(s) 3b and OXC(s) 3a which are directly connected to the relay node 50 are inserted between an OXC 3a and an OXC 3b shown in FIG. 1. Here, the optical switch 51a provided in the relay node 50 corresponds to the optical switch 22 provided in the wavelength path switching node apparatus 2b shown in FIG. 1. Similarly, the optical switch 51b provided in the relay node 50 corresponds to the optical switch 12 provided in the wavelength path switching node apparatus 2a shown in FIG. 1. Therefore, a plurality of the structure which includes: a wavelength path switching node apparatus 2a; an OXC 3a; an OXC 3b; and a wavelength path switching node apparatus 2b are connected in tandem as previously explained.

When traffic stream(s) are relayed by the relay node 50, a plurality of traffic streams (in the example shown in FIG. 6, two traffic streams) originated from different sources may be integrated, and a traffic stream may be divided into a plurality of traffic streams (in the example shown in FIG. 7, two traffic streams) directed to different destinations. Therefore, FIG. 6 shows two sets of the structure which includes: IP routers 1; a wavelength path switching node apparatus 2a; and an OXC 3a. Similarly, FIG. 7 shows two sets of the structure which includes: an OXC 3b; a wavelength path switching node apparatus 2b; and IP routers 1. Of course, the number of traffic streams to be integrated and the number divided traffic streams are not limited to two, and thus the number of OXCs directly connected to the relay node 50 is not limited to three.

Figure 5:
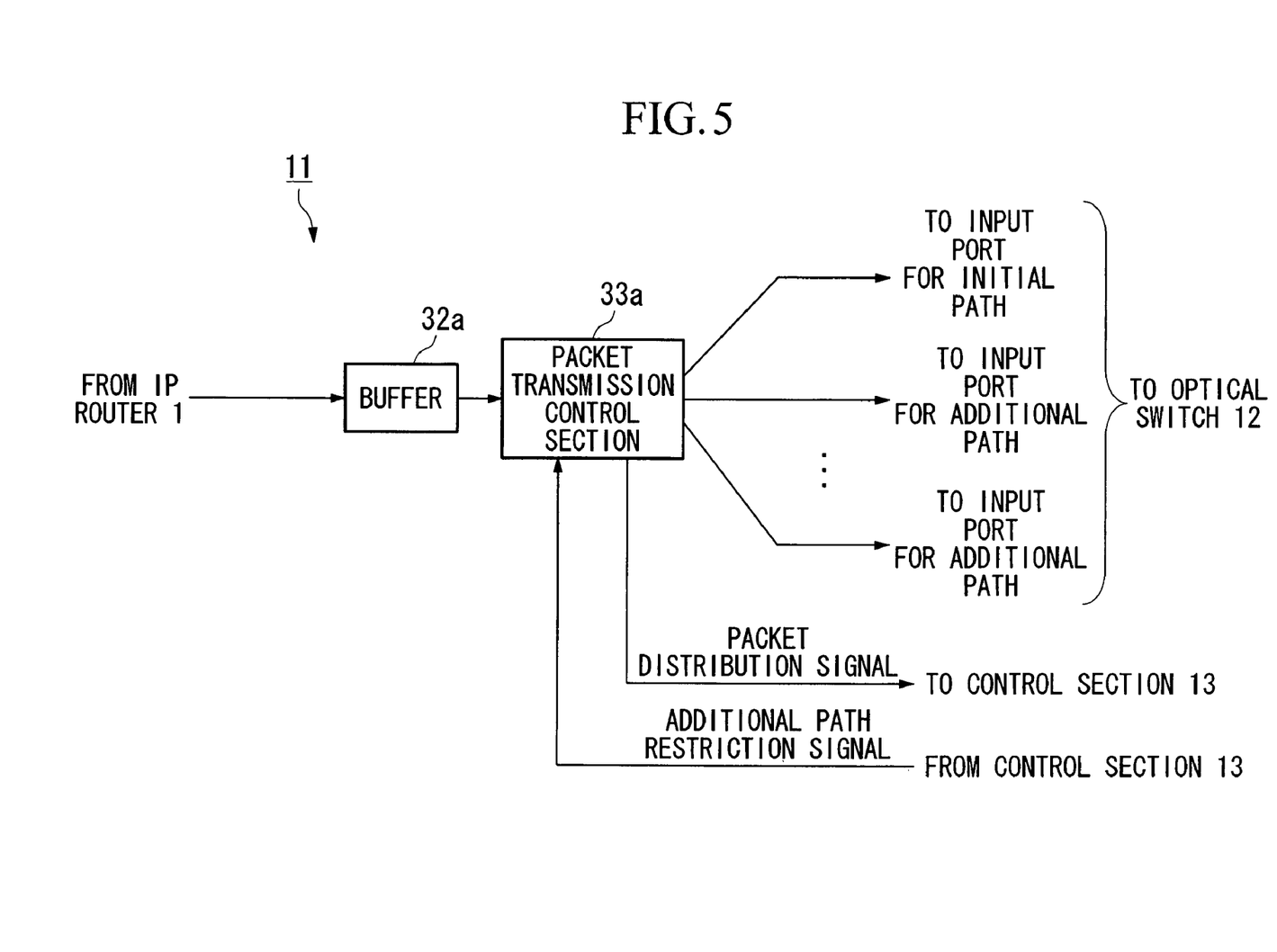
FIG. 5 is a block diagram showing the structure of a packet distributing section 11 according to another embodiment.

Note that in the above described embodiment, input optical signals are converted into electrical signals and packet buffering and distribution is carried out in the packet distributing sections 11; however, it is also possible to carry out the processing with the optical signals remaining as optical signals. FIG. 5 shows the block structure of a packet distributing section 11 that carries out the buffering and distribution of optical input packets as they are. In FIG. 5, a buffer 32a is an optical buffer that stores optical input packets. A packet transmission control section 33a fetches packets from the buffer 32a and distributes them to the initial path and to additional paths. As a result, optical input packets from the router 1 are output still as optical signals to the input port of the optical switch 12 that corresponds to the wavelength path of the destination of the distribution. According to the embodiment shown in FIG. 5, because there is no conversion loss caused by an optical/electrical conversion, the efficiency of the optical switching is improved.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

What is claimed is:

1. A wavelength path switching node apparatus that is used in an optical communication network that performs multiplex transmissions by allocating a plurality of traffic items to a plurality of wavelength paths using a wavelength division multiplexing transmission scheme, comprising:
    a monitoring section that monitors packets of input traffic that are distributed, with top priority given to a semifixed initial path, to the initial path and to dynamically allocated additional paths;
    a first control section that controls allocations of the additional paths based on distribution states of packet units obtained by the monitoring;
    a first wavelength path switching section that switches wavelength paths in accordance with the allocation control of the additional paths by the first control section;
    a buffer that stores packets of the input traffic;
    a packet transmission control section that fetches packets from the buffer, and, with top priority given to the initial path, distributes the packets to the initial path and to the additional paths;
    a second control section that controls allocations of the additional paths based on distribution states of packet units in the packet transmission control section; and
    a second wavelength path switching device that switches wavelength paths in accordance with the allocation control of the additional paths by the second control section.

2. The wavelength path switching node apparatus according to claim 1, wherein the packet transmission control section distributes packets to the additional paths in accordance with a predetermined order of priority.

3. The wavelength path switching node apparatus according to claim 1, wherein the control section allocates at least one reserve additional path when packets are being distributed.

4. The wavelength path switching node apparatus according to claim 2, wherein the control section allocates at least one reserve additional path when packets are being distributed.

5. A wavelength path allocation method for a wavelength path switching node apparatus that is used in an optical communication network that performs multiplex transmissions by allocating a plurality of traffic items to a plurality of wavelength paths using a wavelength division multiplexing transmission scheme, comprising:
    a step of monitoring packets of input traffic that are distributed, with top priority given to a semifixed initial path, to the initial path and to dynamically allocated additional paths;
    a first control step in which allocations of the additional paths in a first wavelength path switching section are controlled based on distribution states of packet units obtained by the monitoring;
    a step in which packets of input traffic are stored in a buffer;
    a packet distributing step in which packets are fetched from the buffer, and, with top priority given to the initial path, the packets are distributed to the initial path and to the additional paths; and
    a second control step in which allocations of the additional paths in a second wavelength path switching section are controlled based on distribution states of packet units in the packet distributing step.

6. The wavelength path allocation method according to claim 5, wherein, in the packet distributing step, the packets are distributed to the additional paths in accordance with a predetermined order of priority.

7. The wavelength path allocation method according to claim 5, wherein, in the control step, at least one reserve additional path is allocated when packets are being distributed.

8. The wavelength path allocation method according to claim 6, wherein, in the control step, at least one reserve additional path is allocated when packets are being distributed.

* * * * *

UNITED STATES PATENT AND TRADEMARK OFFICE
CERTIFICATE OF CORRECTION

| | | |
|---|---|---|
| PATENT NO. | : 7,796,884 B2 | Page 1 of 1 |
| APPLICATION NO. | : 10/789537 | |
| DATED | : September 14, 2010 | |
| INVENTOR(S) | : Hajime Nakamura et al. | |

It is certified that error appears in the above-identified patent and that said Letters Patent is hereby corrected as shown below:

On the title page (73) Assignee:

Delete the phrase "Kiddi Corporation" and insert -- KDDI Corporation --.

Signed and Sealed this
Twenty-second Day of February, 2011

David J. Kappos
*Director of the United States Patent and Trademark Office*